(12) United States Patent
Yang

(10) Patent No.: US 8,240,856 B2
(45) Date of Patent: Aug. 14, 2012

(54) COMPACT PROJECTOR

(75) Inventor: Shu-Chen Yang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 551 days.

(21) Appl. No.: 12/408,731

(22) Filed: Mar. 23, 2009

(65) Prior Publication Data

US 2010/0053566 A1   Mar. 4, 2010

(30) Foreign Application Priority Data

Aug. 29, 2008   (CN) .......................... 2008 1 0304293

(51) Int. Cl.
*G03B 21/26* (2006.01)
(52) U.S. Cl. ......................................... 353/57; 353/119
(58) Field of Classification Search .............. 353/57–61, 353/119
See application file for complete search history.

(56) References Cited

U.S. PATENT DOCUMENTS

| | | | |
|---|---|---|---|
| 5,094,241 A * | 3/1992 | Allen | 600/426 |
| 6,572,231 B1 | 6/2003 | Watanabe | |
| 6,662,036 B2 * | 12/2003 | Cosman | 600/411 |
| 2006/0290893 A1 | 12/2006 | Lim et al. | |
| 2007/0291234 A1 | 12/2007 | Momose et al. | |

* cited by examiner

*Primary Examiner* — Que T Le
*Assistant Examiner* — Jerry Brooks
(74) *Attorney, Agent, or Firm* — Altis Law Group, Inc.

(57) ABSTRACT

A compact projector includes a main control board, an optical engine positioned on the main control board, a heat dissipation assembly, a light source control board, and a digital-micromirror-device control board. The optical engine includes a light-shading member and a projection lens module. The light-shading member includes a first plate and a second plate. The first plate and the projection lens module are approximately perpendicular to the second plate to form a U-shape. The heat dissipation assembly is positioned adjacent to the first plate. The light source control board is positioned on one side of the main control board adjacent to the second plate. The digital-micromirror-device control board is positioned on one side of the main control board perpendicular to the light source control board.

17 Claims, 5 Drawing Sheets

COMPACT PROJECTOR

BACKGROUND

1. Technical Field

The present disclosure relates to projection technology and, particularly, to a compact projector.

2. Description of the Related Art

As digital projectors have become increasingly popular, and demand for compact projectors has grown accordingly. Projectors typically include an optical engine, a heat dissipation assembly dissipating heat generated by the optical engine, and a main control board for controlling the optical engine to form an optical image. These components take up much space, thus adding substantially to the size of the projectors.

Therefore, what is needed is to provide a compact projector which can overcome the limitations described.

DETAILED DESCRIPTION

Figure 1:
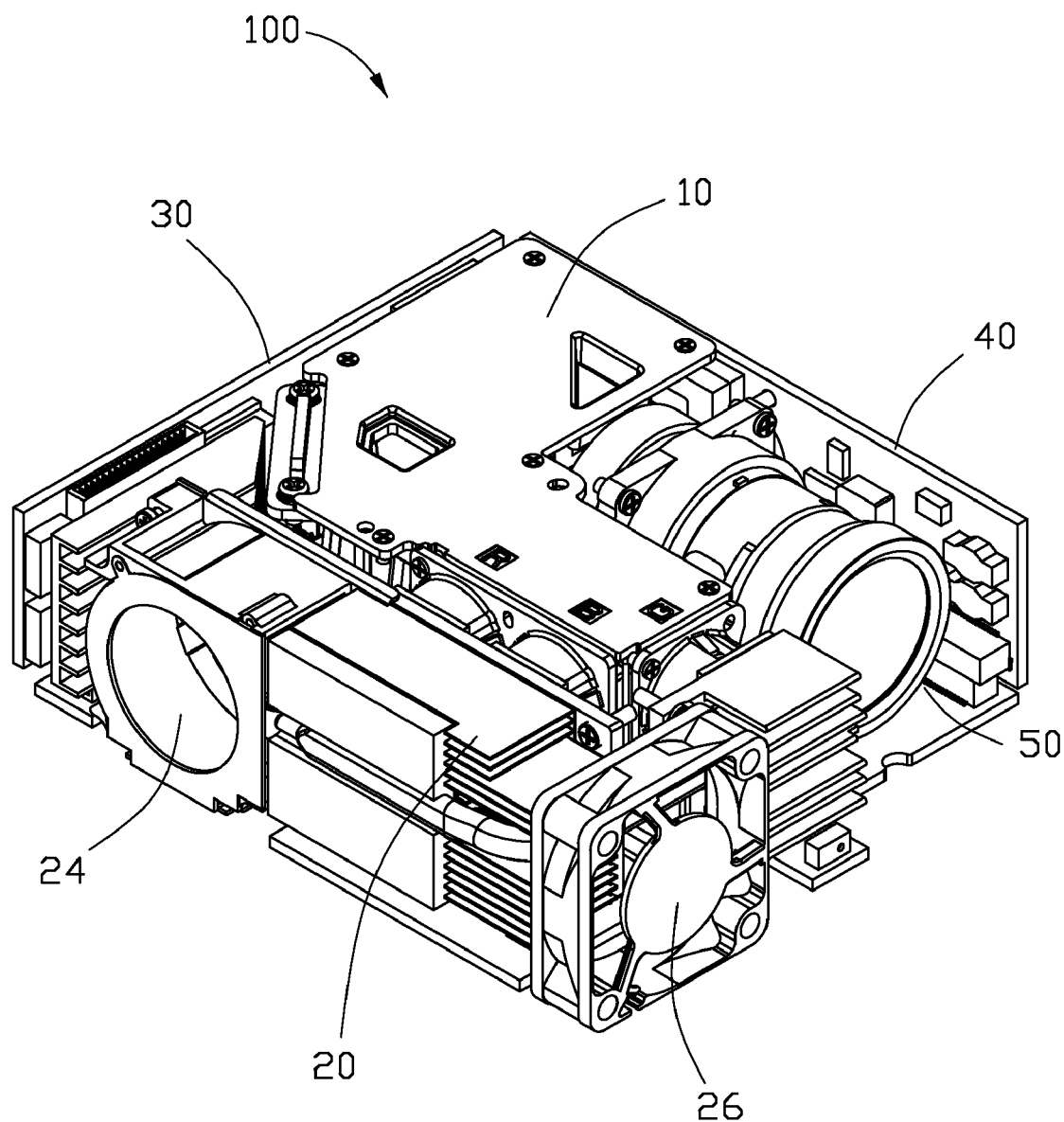
FIG. 1 is an isometric view of a compact projector including an optical engine and a heat dissipation assembly, according to an exemplary embodiment.
Figure 2:
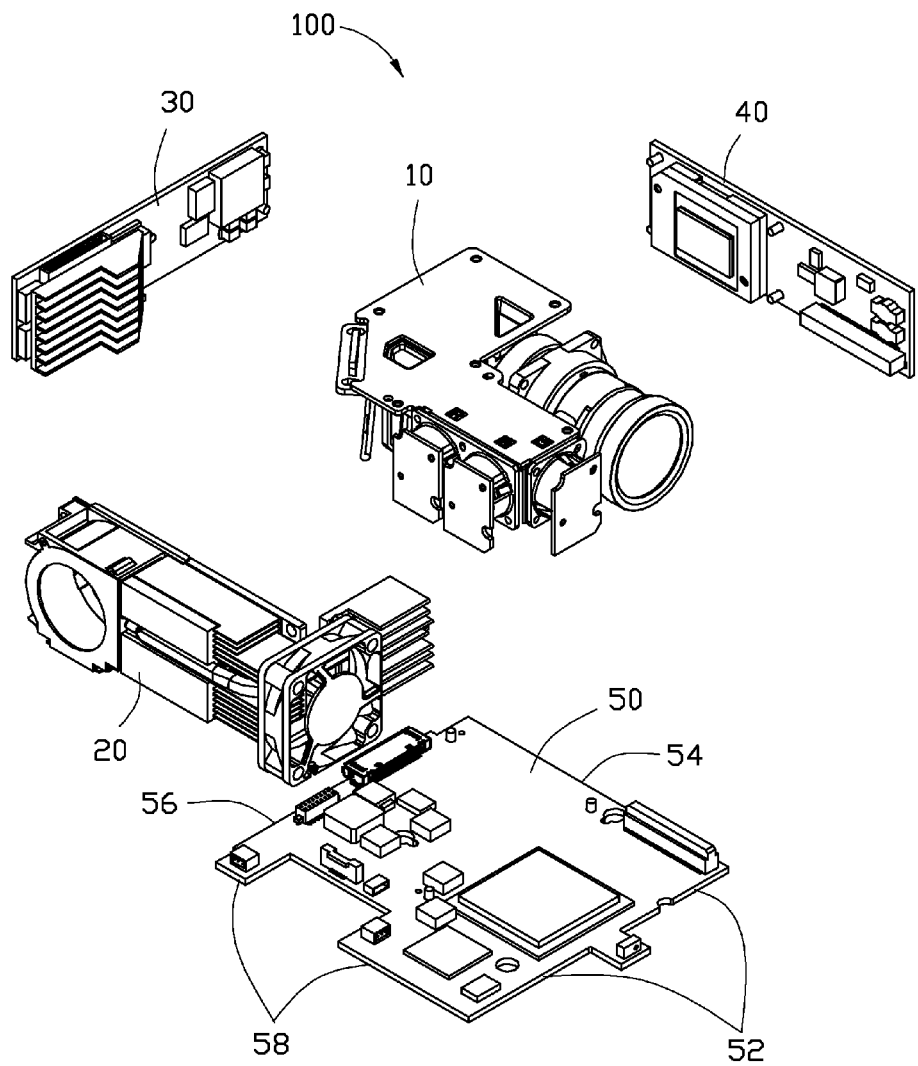
FIG. 2 is an exploded, isometric view of the compact projector of FIG. 1.

Referring to FIGS. 1-2, a compact projector 100, according to an exemplary embodiment, includes an optical engine 10, an L-shaped heat dissipation assembly 20, a light source control board 30, a digital-microwave-device (DMD) control board 40, and a main control board 50.

Figure 3:
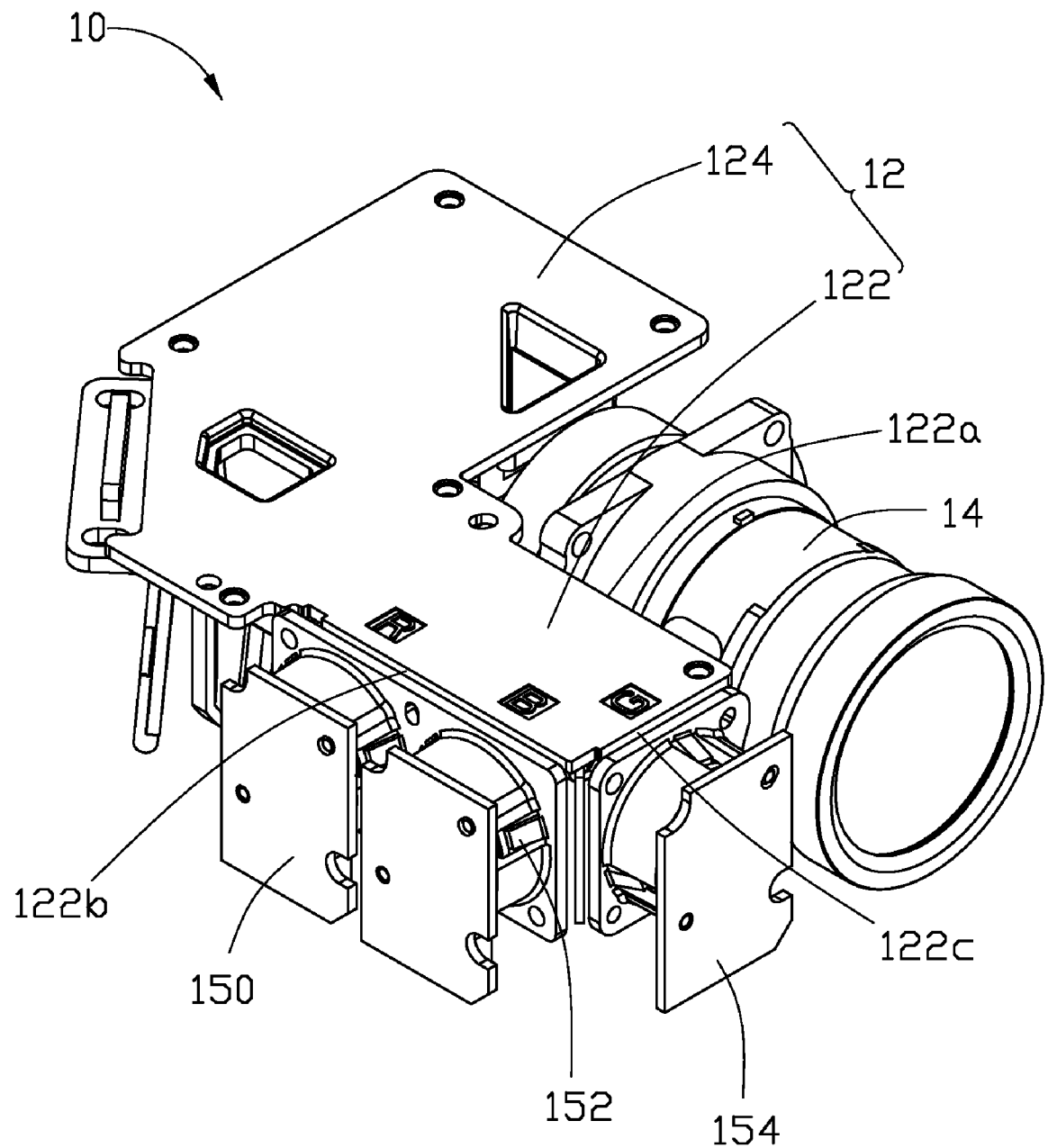
FIG. 3 is an isometric view of the optical engine of the compact projector of FIG. 1.
Figure 4:
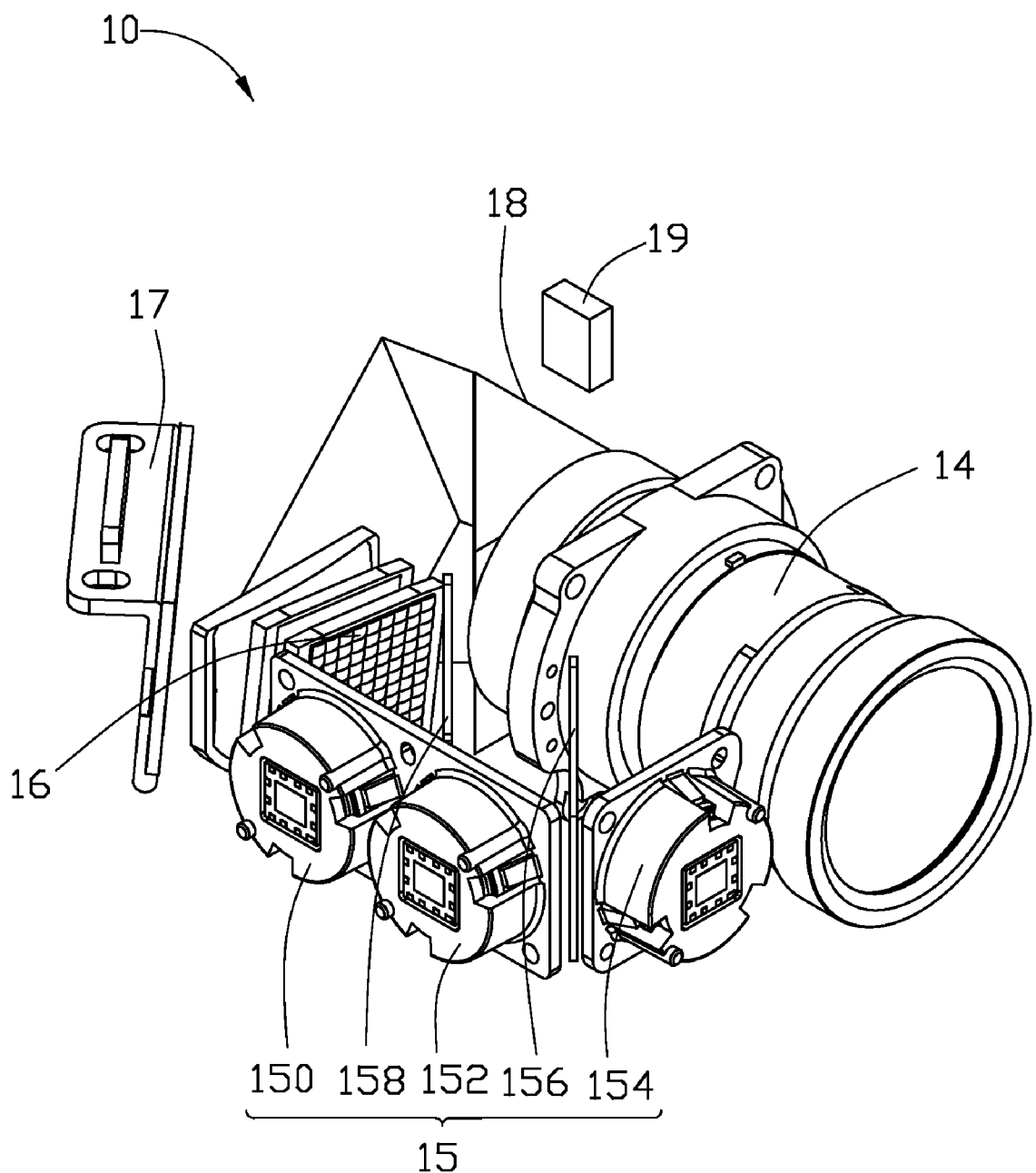
FIG. 4 is a partially-dissembled, isometric view of the optical engine of FIG. 3.

Referring further to FIGS. 3 and 4, the main control board 50 includes a first side 52, a second side 54, a third side 56, and a fourth side 58. The third side 56 is parallel to the first side 52. The fourth side 58 is parallel to the second side 54. The first side 52, the second side 54, the third side 56, and the fourth side 58 are connected to each other end-to-end. The optical engine 10 is positioned on the main control board 50. The optical engine 10 includes an L-shaped light-shading member 12, a projection lens module 14, a light source module 15, a condensing lens 16, a reflector 17, a total-internal-reflective prism 18, and a DMD 19.

The light-shading member 12 includes a first plate 122 and a second plate 124 connected and perpendicular to the first plate 122. The lengthwise direction of the first plate 122 is along a direction from the first side 52 to the third side 56. The lengthwise direction of the second plate 124 is along a direction from the second side 54 to the fourth side 56. The first plate 122 includes a first sidewall 122a approximately perpendicular to the second plate 124, a second sidewall 122b opposite to the first sidewall 122a, and a third sidewall 122c connecting the first sidewall 122a to the second sidewall 122b.

The projection lens module 14 faces toward the first side 52 and is approximately perpendicular to the second plate 124, so that the projection lens module 14 and the light-shading member 12 cooperatively form a U-shape, viewing from above.

The light source module 15 includes a red light source 150, a blue light source 152, a green light source 154, a first dichroic mirror 156, and a second dichroic mirror 158. The red light source 150 and the blue light source 152 are positioned on the main control board 50 and arranged corresponding to the second sidewall 122b of the first plate 122. The green light source 154 is positioned on the main control board 50 and arranged corresponding to the third sidewall 122c of the first plate 122. Therefore, the red light source 150, the blue light source 152, and the green light source 154 cooperatively form an L-shaped arrangement.

The condensing lens 16, the reflector 17, the total-internal-reflective prism 18, and the DMD 19 are positioned under the second plate 124. The first dichroic mirror 156 and the second dichroic mirror 158 are under the first plate 122 and are positioned between the condensing lens 16 and the green light source 154. Light emitted from the blue light source 152 is reflected by the first dichroic mirror 156 towards the second dichroic mirror 158 and is propagated through the second dichroic mirror 158 towards the condensing lens 16. Light emitted from the red light source 150 is reflected by the second dichroic mirror 158 towards the condensing lens 16. Light emitted from the green light source 154 is propagated through the first dichroic mirror 156 and the second dichroic mirror 158 towards the condensing lens 16. The condensing lens 16 is configured for condensing the light from the red, green, and blue light sources 150, 154, 152 to reduce the loss of light energy. In this embodiment, the red light source 150, the green light source 154 and the blue light source 152 include light emitting diodes (LED). The light converged by the condensing lens 16 is reflected by the reflector 17 to the total-internal-reflective prism 18, and then the light is propagated through the total-internal-reflective prism 18 towards the DMD 19.

The DMD 19 corresponds to the total-internal-reflective prism 18. The DMD 19 is configured for modulating the light from the reflector 17 to produce images towards the total-internal-reflective prism 18. The total-internal-reflective prism 18 reflects the modulated light from the DMD 19 to the projection lens module 14. The projection lens module 14 focuses and projects the images onto a screen (not shown).

Figure 5:
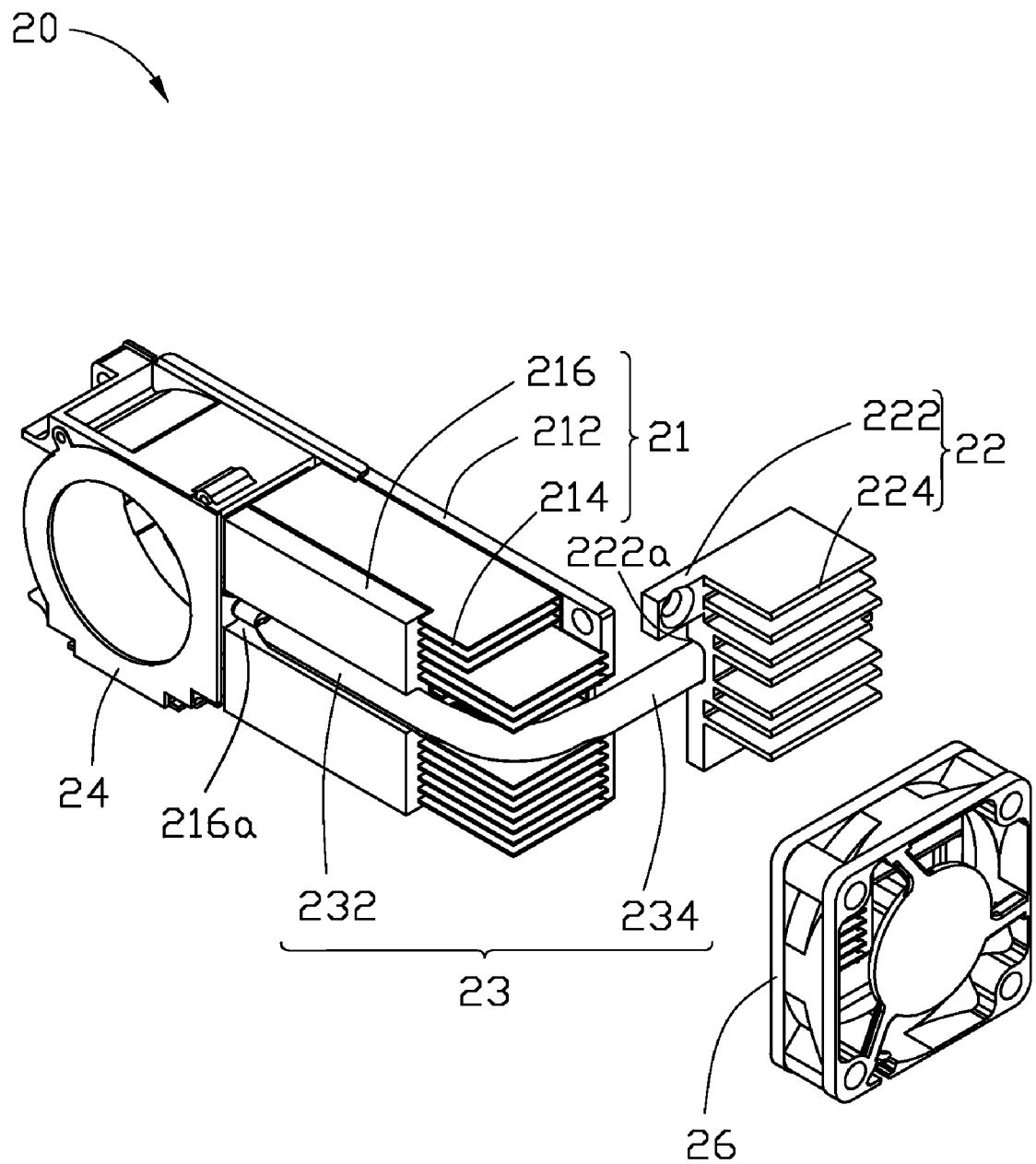
FIG. 5 is a partially-dissembled, isometric view of the heat dissipation assembly of FIG. 1.

Referring to FIGS. 2 and 5, the heat dissipation assembly 20 is positioned around the light source module 15 along the first side 52 and the fourth side 58, and includes a first heat dissipation module 21, a second heat dissipation module 22, an L-shaped heat pipe 23, a vortex fan 24, and an axial fan 26.

The first heat dissipation module 21 includes a first thermal conductive plate 212, a plurality of fins 214 perpendicularly extending from the first thermal conductive plate 212, and a metal sheet 216. The metal sheet 216 is attached to the plurality of fins 214. A first groove 216a is defined at one surface of the metal sheet 216 opposite to the fins 214. The first heat dissipation module 21 is thermally connected to the red light source 150 and the blue light source 152.

The second heat dissipation module 22 includes a second thermal conductive plate 222 and a plurality of fins 224 perpendicularly extending therefrom. The second thermal conductive plate 222 is separate from, and perpendicular to, the first thermal conductive plate 212. A second groove 222a is defined at one surface of the second thermal conductive plate 222 opposite to the plurality of fins 224. The second heat dissipation module 22 is thermally connected to the green light source 156.

The heat pipe 23 includes a condensation section 232 and an evaporation section 234 perpendicularly extending from the condensation section 232. The condensation section 232 is fixed in the first groove 216a, and thermally connected to the metal sheet 216. The evaporation section 234 is fixed in the second groove 222*a*, and thermally connected to the second thermal conductive plate 222. The heat pipe 23 is configured for conducting the heat from the second heat dissipation module 22 to the first heat dissipation module 21.

The vortex fan 24 is positioned on the first thermal conductive plate 212 adjacent to the plurality of the fins 214. The vortex fan 24 is configured for blowing cool air towards the first heat dissipation module 21. The axial fan 26 is positioned between the first heat dissipation module 21 and the second heat dissipation 22 adjacent to the evaporation section 234. The axial fan 26 is configured for exhausting hot air from the first heat dissipation module 21 and the second dissipation module 22 out of the compact projector 100.

The light source control board 30 is positioned on one side of the main control board 50 between the second plate 124 and the third side 56, and adjacent to the reflector 17 and the DMD 19. The light source control board 30 is configured for controlling the light source module 15. The lengthwise direction of the light source control board 30 is along a direction from the second side 54 to the fourth side 58. The DMD control board 40 is positioned on the other side of the main control board 50, perpendicular to the light source control board 30. In particular, the DMD control board 40 is positioned between the projection lens module 14 and the second side 54. The DMD control board 40 is configured for controlling the DMD 19 to modulate the light from the total-internal-reflective prism 18. The main control board 50 is configured for controlling the vortex fan 24 and the axial fan 26. The light source control board 30 and the DMD control board 40 electrically connect to the main control board 50.

The heat dissipation assembly 20, the light source control board 30, the DMD control board 40, and the main control board 50 are assembled around the optical engine 10 to fit the U-shaped configuration. Accordingly, the size of the compact projector 100 is substantially decreased. In addition, heat generated by the light source module 15 is conducted to the first heat dissipation module 21 and the second heat dissipation module 22 and is dissipated by airflow of the vortex fan 24 and the axial fan 26. As a result, the heat generated by the compact projector 100 is dissipated efficiently.

It is to be understood, however, that even though numerous characteristics and advantages of the present embodiments have been set fourth in the foregoing description, together with details of the configurations and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A compact projector comprising:
    a main control board comprising a first side, a second side, a third side parallel to the first side, and a fourth side parallel to the second side, the four sides connected to each other end-to-end;
    an optical engine positioned on the main control board, the optical engine comprising a light-shading member and a projection lens module facing toward the first side, the light-shading member comprising a first plate and a second plate, a lengthwise direction of the first plate being along a direction from the first side to the third side, a lengthwise direction of the second plate being along a direction from the second side to the fourth side, the first plate and the projection lens module being approximately perpendicular to the second plate to form a U-shape;
    an L-shaped heat dissipation assembly positioned adjacent to the first plate and along the first side and the fourth side;
    a light source control board positioned on a rear portion of the main control board between the second plate and the third side, a lengthwise direction of the light source control board being along a direction from the second side to the fourth side; and
    a digital-micromirror-device control board positioned on the main control board between the projection lens module and the second side, and being perpendicular to the light source control board.

2. The compact projector as claimed in claim 1, wherein the optical engine further comprises a light source module corresponding to the first plate, a condensing lens, a reflector, a total-internal-reflective prism, and a digital micromirror device, and the condensing lens, the total-internal-reflective prism and the digital micromirror device are positioned under the second plate.

3. The compact projector as claimed in claim 2, wherein the first plate comprises a first sidewall approximately perpendicular to the second plate, a second sidewall opposite to the first sidewall, and a third sidewall connecting the first sidewall to the second sidewall, the light source module comprises a red light source, a blue light source, and a green light source, the red light source and the blue light source are arranged corresponding to the second sidewall, and the green light source is arranged corresponding to the third sidewall.

4. The compact projector as claimed in claim 3, wherein the light source module further comprises a first dichroic mirror and a second dichroic mirror under the first plate, and the first dichroic mirror and the second dichroic mirror are positioned between the condensing lens and the green light source.

5. The compact projector as claimed in claim 4, wherein the heat dissipation assembly comprises a first heat dissipation module, a second heat dissipation module, an L-shaped heat pipe, a vortex fan, and an axial fan, the second heat dissipation module is separated from and perpendicular to the first heat dissipation module, the heat pipe connects the first heat dissipation module to the second heat dissipation module, the vortex fan is positioned on the first heat dissipation module, and the axial fan is positioned between the first heat dissipation module and the second heat dissipation module.

6. The compact projector as claimed in claim 5, wherein the first heat dissipation module comprises a first thermal conductive plate, a plurality of fins perpendicularly extending from the first thermal conductive plate, and a metal sheet attached to the plurality of fins, and wherein the second heat dissipation module comprises a second thermal conductive plate, a plurality of fins perpendicularly extending from the second thermal conductive plate, and the second thermal conductive plate is separated from and perpendicular to the first thermal conductive plate.

7. The compact projector as claimed in claim 6, wherein the heat pipe comprises a condensation section and an evaporation section perpendicularly extending from the condensation section, a first groove is defined at one surface of the metal sheet opposite to the first thermal conductive plate, a second groove is defined at one surface of the second thermal conductive plate opposite to the plurality of fins, the condensation section is fixed in the first groove and thermally connected to the metal sheet, and the evaporation section is fixed in the second groove and thermally connected to the second thermal conductive plate.

8. The compact projector as claimed in claim 6, wherein the first heat dissipation module is thermally connected to the red light source and the blue light source, and the second heat dissipation module is thermally connected to the green light source.

9. A compact projector comprising:
a main control board;
an optical engine positioned on the main control board, the optical engine comprising a light-shading member and a projection lens module, the light-shading member comprising a first plate and a second plate, the first plate and the projection lens module being approximately perpendicular to the second plate to form a U-shape;
a heat dissipation assembly positioned adjacent to the first plate and comprising:
a first heat dissipation module comprising a first thermal conductive plate, a plurality of fins perpendicularly extending from the first thermal conductive plate, and a metal sheet attached to the plurality of fins, a first groove defined at one surface of the metal sheet opposite to the first thermal conductive plate;
a second heat dissipation module comprising a second thermal conductive plate, and a plurality of fins perpendicularly extending from the second thermal conductive plate, a second groove defined at one surface of the second thermal conductive plate opposite to the plurality of fins; and
an L-shaped heat pipe comprising a condensation section and an evaporation section perpendicularly extending from the condensation section, the condensation section fixed in the first groove and thermally connected to the metal sheet, the evaporation section fixed in the second groove and thermally connected to the second thermal conductive plate;
a light source control board positioned on one side of the main control board and adjacent to the second plate; and
a digital-micromirror-device control board positioned on one side of the main control board perpendicular to the light source control board and adjacent to the projection lens module.

10. The compact projector as claimed in claim 9, wherein the optical engine further comprises a light source module corresponding to the first plate, a condensing lens, a reflector, a total-internal-reflective prism, and a digital micromirror device, and the condensing lens, the total-internal-reflective prism and the digital micromirror device are positioned under the second plate.

11. The compact projector as claimed in claim 10, wherein the first plate comprises a first sidewall approximately perpendicular to the second plate, a second sidewall opposite to the first sidewall, and a third sidewall connecting the first sidewall to the second sidewall, the light source module comprises a red light source, a blue light source, and a green light source, the red light source and the blue light source are arranged corresponding to the second sidewall, and the green light source is arranged corresponding to the third sidewall.

12. The compact projector as claimed in claim 11, wherein the light source module further comprises a first dichroic mirror and a second dichroic mirror both under the first plate, and the first dichroic mirror and the second dichroic mirror are positioned between the condensing lens and the green light source.

13. The compact projector as claimed in claim 9, wherein the heat dissipation assembly further comprises a vortex fan and an axial fan, the vortex fan is positioned on the first heat dissipation module, and the axial fan is positioned between the first heat dissipation module and the second heat dissipation module.

14. The compact projector as claimed in claim 9, wherein the second thermal conductive plate is separated from and perpendicular to the first thermal conductive plate.

15. The compact projector as claimed in claim 11, wherein the first heat dissipation module is thermally connected to the red light source and the blue light source, and the second heat dissipation module is thermally connected to the green light source.

16. The compact projector as claimed in claim 9, wherein the main control board comprises a first side, a second side, a third side opposite to the first side, and a fourth side opposite to the first side, the four sides connected to each other end-to-end, the projection lens module faces toward the first side, a lengthwise direction of the first plate is along a direction from the first side to the third side, a lengthwise direction of the second plate is along a direction from the second side to the fourth side, the light source control board is positioned between the second plate and the third side, and the digital-micromirror-device control board is positioned between the projection module and the second side.

17. The compact projector as claimed in claim 3, wherein the red light source, the blue light source, and the green light source cooperatively from an L-shaped arrangement to fit the heat dissipation assembly.

* * * * *